United States Patent
Seo et al.

(10) Patent No.: US 9,462,573 B2
(45) Date of Patent: Oct. 4, 2016

(54) METHOD OF TRANSMITTING CONTROL INFORMATION USING PHYSICAL UPLINK SHARED CHANNEL REGION IN MIMO ANTENNA SYSTEM

(71) Applicant: Electronics and Telecommunications Research Institute, Daejeon (KR)

(72) Inventors: Bang Won Seo, Daejeon (KR); Young Jo Ko, Daejeon (KR); Byung Jang Jeong, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 242 days.

(21) Appl. No.: 13/718,629

(22) Filed: Dec. 18, 2012

(65) Prior Publication Data

US 2013/0155977 A1     Jun. 20, 2013

Related U.S. Application Data

(63) Continuation of application No. 12/895,100, filed on Sep. 30, 2010, now Pat. No. 8,442,022.

(30) Foreign Application Priority Data

Oct. 1, 2009   (KR) .............................. 2009-0093653
Feb. 1, 2010   (KR) .............................. 2010-0009119
Apr. 15, 2010  (KR) .............................. 2010-0034655

(51) Int. Cl.
*H04W 72/04*   (2009.01)
*H04L 5/00*    (2006.01)
*H04L 1/00*    (2006.01)

(52) U.S. Cl.
CPC ............ *H04W 72/04* (2013.01); *H04L 5/0023* (2013.01); *H04L 5/0053* (2013.01); *H04L 5/0055* (2013.01); *H04L 5/0057* (2013.01); *H04L 1/001* (2013.01)

(58) Field of Classification Search
None
See application file for complete search history.

(56) References Cited

U.S. PATENT DOCUMENTS 8,275,408 B2 *  9/2012  Attar ................... H04L 1/0026
                                                      370/318
2008/0095106 A1  4/2008  Malladi et al.
(Continued)

FOREIGN PATENT DOCUMENTS

WO   2009/057285 A1   5/2009
WO   2010/087641 A2   8/2010

OTHER PUBLICATIONS

Catt, ZTE, "MIMO Technology in MC TD-SCDMA," 3GPP TSG RAN WG1#42, R1-050799, 4 pages (2005).
(Continued)

*Primary Examiner* — Kenny Lin

(57) ABSTRACT

Provided is a method of transmitting control information using a physical uplink shared channel (PUSCH) region in a system employing a multi-input multi-output (MIMO) antenna system in which transmission is performed through a plurality of layers. A method of transmitting a channel quality indicator (CQI)/precoding matrix indicator (PMI) using a PUSCH region in a system employing a MIMO antenna system in which transmission is performed through a plurality of layers includes encoding the CQI/PMI using one channel encoder, and transmitting the encoded CQI/PMI using some or all of the layers. Accordingly, it is possible to transmit uplink control information through a PUSCH region using a plurality of layers.

24 Claims, 7 Drawing Sheets

(56) References Cited

U.S. PATENT DOCUMENTS

| | | | |
|---|---|---|---|
| 2009/0073922 A1 | 3/2009 | Malladi et al. | |
| 2009/0097466 A1* | 4/2009 | Lee | H04L 1/0081 370/344 |
| 2009/0207784 A1 | 8/2009 | Lee et al. | |
| 2009/0210766 A1 | 8/2009 | Katayama et al. | |
| 2009/0262699 A1* | 10/2009 | Wengerter | H04L 1/0072 370/330 |
| 2009/0296644 A1 | 12/2009 | Cheon et al. | |
| 2010/0041344 A1 | 2/2010 | Kim et al. | |
| 2010/0054353 A1 | 3/2010 | Roh et al. | |
| 2010/0067616 A1 | 3/2010 | Chun et al. | |
| 2010/0115358 A1* | 5/2010 | Kotecha | H04L 1/1812 714/748 |
| 2010/0135359 A1 | 6/2010 | Nakao et al. | |
| 2010/0202433 A1 | 8/2010 | Ihm et al. | |
| 2010/0284351 A1 | 11/2010 | Liang et al. | |
| 2011/0033001 A1 | 2/2011 | Roh et al. | |
| 2012/0127953 A1 | 5/2012 | Kawamura et al. | |
| 2012/0140687 A1 | 6/2012 | Nakao et al. | |

OTHER PUBLICATIONS

ETRI, "Uplink SU MIMO with simple layer interleaving," 3GPP TSG RAN WG1 Meeting #55bid, R1-090271, 5 pages (2009).
Extended European Search Report for Application No. 13168102.5, 8 pages, dated Aug. 6, 2013.
Extended European Search Report for Application No. 13168104.1, 8 pages, dated Aug. 6, 2013.
LTE, "3rd Generation Partnership Project; Technical Specification Group Radio Access Network; Evolved Universal Terrestrial Radio Access (E-UTRA); Multiplexing and channel coding (Release 8)," 3GPP TS 36.212 V8.7.0, 60 pages (2009).
Motorola, "Multi-Antenna Support in UL PUSCH/PUCCH/PRACH/SRS Transmission," 3GPP TSG RAN1#57bis, R1-092644, 5 pages (2009).
ZTE, "Layer Shifting in Uplink MIMO," 3GPP TSG RAN WG1 Meeting #56bis, R1-091431, 3 pages (2009).
European Search Report for Application No. 10184345.6, 12 pages, dated Oct. 23, 2012.

* cited by examiner

METHOD OF TRANSMITTING CONTROL INFORMATION USING PHYSICAL UPLINK SHARED CHANNEL REGION IN MIMO ANTENNA SYSTEM

RELATED APPLICATIONS

This application is a divisional application of U.S. patent application Ser. No. 12/895,100 filed on Sep. 30, 2010, which claims priority to, and the benefit of, Korean Patent Application No. 10-2009-0093653 filed on Oct. 1, 2009, Korean Patent Application No. 10-2010-0009119 filed on Feb. 1, 2010 and Korean Patent Application No. 10-2010-0034655 filed on Apr. 15, 2010 in the Korean Intellectual Property Office (KIPO). The entire contents of the aforementioned applications are hereby incorporated by reference.

BACKGROUND

1. Technical Field

Example embodiments of the present invention relate in general to a transmission method using a multi-input multi-output (MIMO) antenna system in a third generation partnership project (3GPP) long term evolution (LTE) uplink, and more specifically to a method of transmitting control information, such as ACK/NACK information, a channel quality indicator (CQI)/precoding matrix indicator (PMI), and a rank indicator (RI), using a physical uplink shared channel (PUSCH) region in a MIMO antenna system.

2. Related Art

FIG. 1 shows a time-frequency resource grid when control information is transmitted using one layer and a PUSCH region according to 3GPP technical specification (TS) 36.211 V.8.6.0.

In other words, FIG. 1 illustrates a method defined in 3GPP TS 36.211 V.8.6.0, that is, resource arrangements in a region 102 for transmitting a CQI and a PMI, a region 105 for transmitting ACK/NACK information, and a region 104 for transmitting an RI through a PUSCH region.

FIG. 1 shows a structure of one resource block (RB) or a plurality of RBs, in which 14 symbols are transmitted in one sub-frame in the time domain, when a normal cyclic prefix (CP) is used. Even when an extended CP is used, a structure similar to this structure is obtained. Thus, only the case in which the normal CP is used is described for convenience, but the description can also be applied similarly when the extended CP is used.

Although symbols in the time domain are referred to by various names such as an orthogonal frequency division multiplexing (OFDM) symbol, a single carrier frequency division multiple access (SC-FDMA) symbol, a discrete Fourier transform (DFT)-spread OFDM symbol, and a DFT-precoded OFDM symbol, the symbols are referred to as OFDM symbols for convenience in example embodiments of the present invention.

Referring to FIG. 1, in the fourth OFDM symbol section of each slot, a reference signal (RS) 101 is transmitted using all frequency resources in allocated RBs, and a CQI/PMI 102 is transmitted using frequency resources disposed at an uppermost region.

Also, ACK/NACK information is transmitted in a lowermost region opposite to a frequency used by the CQI/PMI using the third and fifth OFDM symbols 105 of each slot. An RI is transmitted in the lowermost region opposite to the frequency used by the CQI/PMI using the second and sixth OFDM symbols 104 of each slot.

In 3GPP TS 36.211 V.8.6.0, only a method of transmitting control information using one layer and a part of a PUSCH region is specified. However, in next generation mobile communication technology such as LTE-advanced, which is the next version of LTE, standardization is underway to enable PUSCH transmission using a plurality of layers. In preparation for PUSCH transmission using a plurality of layers, a new standard for a method of transmitting control information in a PUSCH region is required.

SUMMARY

Accordingly, example embodiments of the present invention are provided to substantially obviate one or more problems due to limitations and disadvantages of the related art.

Example embodiments of the present invention provide a method of transmitting control information such as ACK/NACK information, a channel quality indicator (CQI)/precoding matrix indicator (PMI), and a rank indicator (RI) using a physical uplink shared channel (PUSCH) region in a multi-input multi-output (MIMO) antenna system.

In some example embodiments, a method of transmitting a CQI/PMI using a PUSCH region in a system employing a MIMO antenna system in which transmission is performed through a plurality of layers includes transmitting, at a first layer, the CQI/PMI using the same resources as specified in third generation partnership project (3GPP) technical specification (TS) 36.211 V.8.6.0, and transmitting, at the other layers, data in a resource position in which the first layer transmits the CQI/PMI.

In other example embodiments, a method of transmitting a CQI/PMI using a PUSCH region in a system employing a MIMO antenna system in which transmission is performed through a plurality of layers includes: encoding the CQI/PMI using one channel encoder; and transmitting the encoded CQI/PMI using some or all of the layers.

Here, the some layers may include all layers generated from the same codeword. When two or more codewords are present in an uplink, a codeword having a high modulation and coding scheme (MCS) level may be selected as the codeword from which the some layers are generated.

Here, the transmitting the encoded CQI/PMI using the some or all of the layers may include dividing and transmitting the encoded CQI/PMI according to the some or all of the layers.

In other example embodiments, a method of transmitting control information using a PUSCH in a system employing a MIMO antenna system in which transmission is performed through a plurality of layers includes separating a region in which the control information is transmitted and a region in which data is transmitted according to time or frequency in all the layers.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
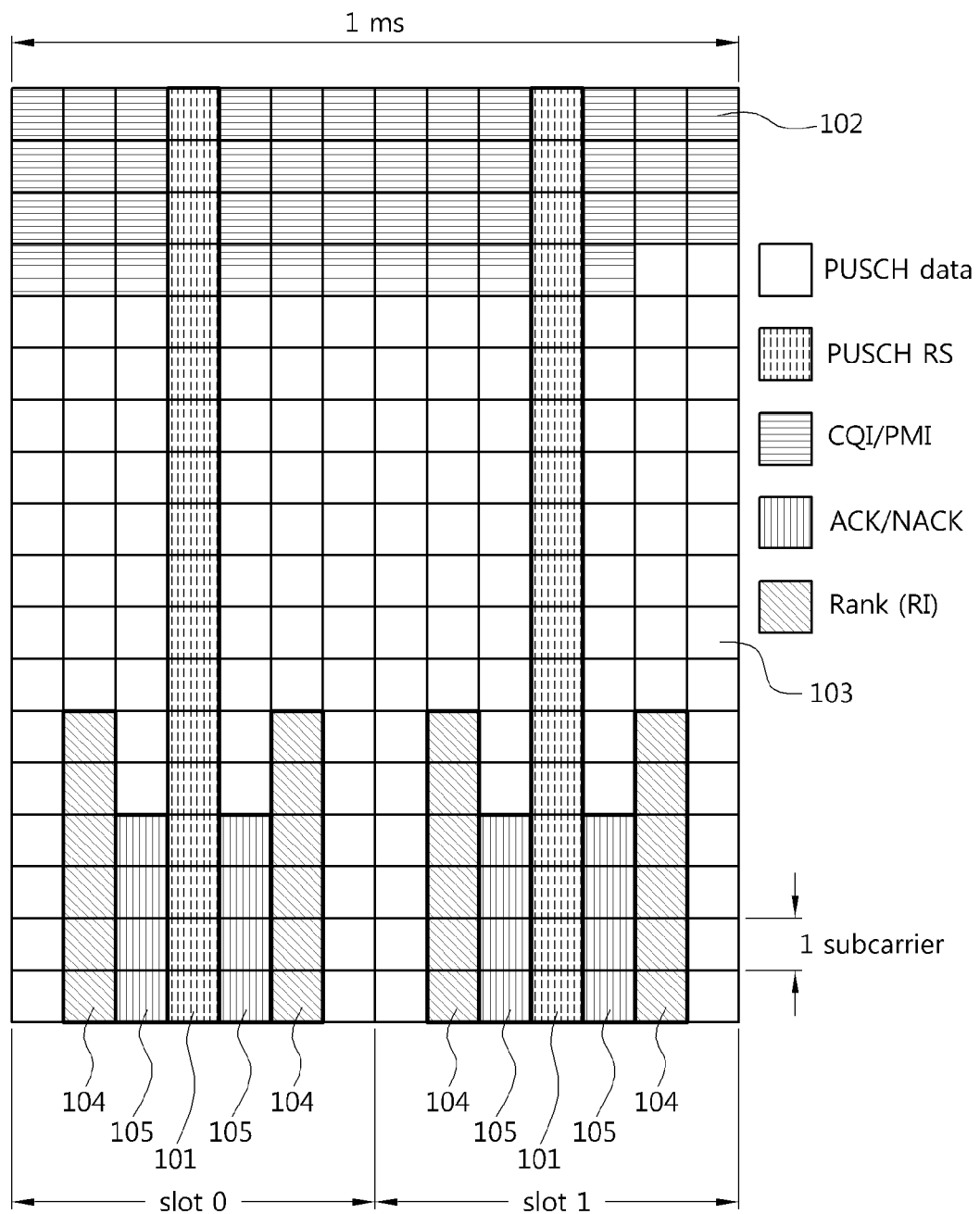
FIG. 1 shows a time-frequency resource grid when control information is transmitted using one layer and an uplink data physical channel region according to third generation partnership project (3GPP) technical specification (TS) 36.211 V.8.6.0.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

The term "terminal" used herein may be referred to as a mobile station (MS), user equipment (UE), user terminal (UT), wireless terminal, access terminal (AT), subscriber unit, subscriber station (SS), wireless device, wireless communication device, wireless transmit/receive unit (WTRU), moving node, mobile, or other terms. Various example embodiments of a terminal may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or terminals having a combination of such functions, but are not limited to these.

The term "base station" used herein generally denotes a fixed or moving point communicating with a terminal, and may be referred to as a Node-B, evolved Node-B (eNB), base transceiver system (BTS), access point, relay, femtocell, and other terms.

In example embodiments of the present invention, a single radio frequency (RF) carrier transmission system will be mainly described for convenience. However, example embodiments of the present invention can be likewise applied to a multiple RF carrier transmission system or a transmission system using several bandwidths.

Here, the several bandwidths may neighbor each other or may be apart from each other. Also, in example embodiments of the present invention, only a discrete Fourier transform (DFT)-spread orthogonal frequency division multiplexing (OFDM) system will be described for convenience. However, example embodiments of the present invention can also be likewise applied to a single carrier frequency division multiple access (SC-FDMA) system and an OFDM system.

Although only a case in which a normal cyclic prefix (CP) is used will be described in example embodiments of the present invention, example embodiments of the present invention can be similarly applied to a case in which an extended CP is used.

Example embodiments of the present invention relate to a method of transmitting control information through a physical uplink shared channel (PUSCH) when a plurality of transmitter antennas are used in an uplink.

ACK/NACK Information Transmission Method

First, a method of transmitting ACK/NACK information among control information will be described below.

Example Embodiment #1

ACK/NACK information may be one bit or two bits. Respective cases in which ACK/NACK information is one bit and two bits will be separately described.

1) When HARQ-ACK Information is One Bit

Hybrid automatic repeat request (HARQ)-ACK information is encoded to generate bits corresponding to one quadrature amplitude modulation (QAM) symbol, and the generated bits are repeated to generate bits corresponding to several QAM symbols. Then, the generated bits are scrambled. Here, it is assumed that the QAM symbols obtained through modulation mapping are $s_1, s_2, \ldots,$ and $s_M$, and transmission is performed using L frequency resources (i.e., sub-carriers) for each OFDM symbol section.

In this case, according to third generation partnership project (3GPP) technical specification (TS) 36.211 V.8.6.0, Layer 1 transmits $[s_1, s_2, \ldots, s_L]$ using a third OFDM symbol of a first slot, $[s_{L+1}, s_{L+2}, \ldots, s_{2L}]$ using a fifth OFDM symbol of the first slot, $[s_{2L+1}, s_{2L+2}, \ldots, s_{3L}]$ using a third OFDM symbol of a second slot, and $[s_{3L+1}, s_{3L+2}, \ldots, s_{4L}]$ using a fifth OFDM symbol of the second slot.

In this example embodiment of the present invention, QAM symbols are multiplied by different codes according to respective layers and transmitted. To be specific, assuming that a $k^{th}$ code having a length L is $a_k=[a_{k,1}, a_{k,2}, \ldots, a_{k,L}]^T$, a $k^{th}$ layer transmits $[a_{k,1}s_1, a_{k,2}s_2, \ldots, a_{k,L}s_L]$ using a third OFDM symbol of a first slot, $[a_{k,1}s_{L+1}, a_{k,2}s_{L+2}, \ldots, a_{k,L}s_{2L}]$ using a fifth OFDM symbol of the first slot, $[a_{k,1}s_{2L+1}, a_{k,2}s_{2L+2}, \ldots, a_{k,L}s_{3L}]$ using a third OFDM symbol of a second slot, and $[a_{k,1}s_{3L+1}, a_{k,2}s_{3L+2}, \ldots, a_{k,L}s_{4L}]$ using a fifth OFDM symbol of the second slot.

Here, a code $a_1$ for a first layer can be $[1, 1, \ldots, 1]$. In this case, Layer 1 transmits the same value as specified in 3GPP TS 36.211 V.8.6.0. Example embodiments for a code $a_k$ can be Hadamard code, DFT matrix code, Zadoff-Chu code, and so on.

2) When HARQ-ACK Information is Two Bits

In this case, 2-bit HARQ-ACK information is encoded to generate bits corresponding to three QAM symbols, and the generated bits are repeated to generate bits corresponding to several QAM symbols. Then, the generated bits are scrambled. Here, it is assumed that the QAM symbols obtained through modulation mapping are $s_1, s_2, \ldots,$ and $s_M$, and transmission is performed using L frequency resources for each OFDM symbol section.

In this example embodiment of the present invention, HARQ-ACK QAM symbols are multiplied by different codes according to a plurality of layers and transmitted. To be specific, assuming that a $k^{th}$ code having a length L is $a_k=[a_{k,1}, a_{k,2}, \ldots, a_{k,L}]^T$, a $k^{th}$ layer transmits $[a_{k,1}s_1, a_{k,2}s_2, \ldots, a_{k,L}s_L]$ using a third OFDM symbol of a first slot, $[a_{k,1}s_{L+1}, a_{k,2}s_{L+2}, \ldots, a_{k,L}s_{2L}]$ using a fifth OFDM symbol of the first slot, $[a_{k,1}s_{2L+1}, a_{k,2}s_{2L+2}, \ldots, a_{k,L}s_{3L}]$ using a third OFDM symbol of a second slot, and $[a_{k,1}s_{3L+1}, a_{k,2}s_{3L+2}, \ldots, a_{k,L}s_{4L}]$ using a fifth OFDM symbol of the second slot.

Here, a code $a_1$ for a first layer can be $[1, 1, \ldots, 1]$. In this case, Layer 1 transmits the same value as specified in 3GPP TS 36.211 V.8.6.0. Example embodiments for a code $a_k$ can be Hadamard code, DFT matrix code, Zadoff-Chu code, and so on.

To generate three QAM symbols by encoding the above-mentioned 2-bit HARQ-ACK information, the same conventional encoding method as specified in 3GPP TS 36.211 V.8.6.0 may be used, or the following new method according to this example embodiment of the present invention may be used.

To generate three QAM symbols by encoding the above-mentioned 2-bit HARQ-ACK information, the method according to this example embodiment of the present invention designs the three QAM symbols to uniformly vary.

Figure 2:
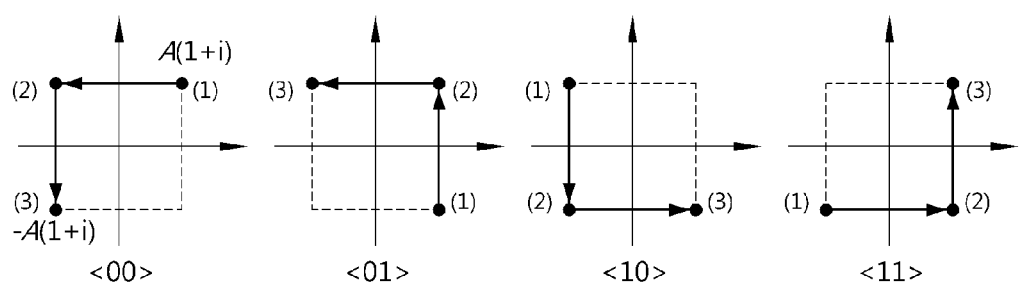
FIG. 2 illustrates a method of encoding 2-bit hybrid automatic repeat request (HARQ)-ACK information according to example embodiments of the present invention and quadrature amplitude modulation (QAM) symbols.

FIG. 2 illustrates a method of encoding 2-bit HARQ-ACK information according to example embodiments of the present invention and QAM symbols.

In other words, FIG. 2 illustrates an example of three symbols designed to have a phase varying by 90 degrees according to an example embodiment of the present invention.

For example, when 2-bit HARQ-ACK information is 00, encoding is carried out to generate three QAM symbols A(1+i), A(−1+i), and −A(1+i), thereby obtaining bits. Here, A has a value varying according to quadrature phase-shift keying (QPSK), 16 QAM, and 64 QAM. FIG. 2 shows an example of encoding three QAM symbols when 2-bit HARQ-ACK information is 00, 01, 10, and 11 in left-to-right order.

In a carrier aggregation environment, channel coding can be performed first on all ACK/NACK bits to be fed back. An example of channel coding is Reed-Muller (RM) block coding. The term "ACK/NACK information" indicates ACK/NACK information to which channel coding has been applied and ACK/NACK information to which channel coding has not been applied.

Example Embodiment #2

In another method of transmitting ACK/NACK information using a plurality of layers through a PUSCH, Layer 1 transmits the ACK/NACK information in the same method as specified in 3GPP TS 36.211 V.8.6.0 (see FIG. 1), and the other layers transmit data in resource positions in which Layer 1 transmits the ACK/NACK information.

In still another method of transmitting ACK/NACK information using a plurality of layers through a PUSCH, Layer 1 transmits the ACK/NACK information in the same method as specified in 3GPP TS 36.211 V.8.6.0 (see FIG. 1), and the other layers do not transmit anything in the resource positions.

In yet another method of transmitting ACK/NACK information using a plurality of layers through a PUSCH, Layers 1, 2, . . . , and Q (i.e., some layers) transmit the ACK/NACK information in resource positions in which ACK/NACK information is transmitted through a PUSCH (see FIG. 1) as specified in 3GPP TS 36.211 V.8.6.0, and the other layers (layers other than the some layers) transmit data in the resource positions.

In a method for Q, all layers obtained from the same codeword are used. For example, when a codeword is divided by four layers, Q indicates four. In another method for Q, one layer is used.

When ACK/NACK information is transmitted using a plurality of layers, different scrambling bits may be applied to a signal mapped to the respective layers. In this way, interference between the layers can be reduced.

In yet another method of transmitting ACK/NACK information using a plurality of layers through a PUSCH, the ACK/NACK information is encoded and scrambled, and the QAM symbols $s_1, s_2, \ldots,$ and $s_M$ obtained through modulation mapping are separately transmitted using the layers. To be specific, when L frequency resources are used for each OFDM symbol section, and the number of layers is N, $s_1, s_{N+1}, s_{2N+1}, \ldots$ are transmitted through Layer 1, and $s_2, s_{N+2}, s_{2N+2}, \ldots$ are transmitted through Layer 2. In a method available at this time, only one layer transmits ACK/NACK information in a resource position for transmitting ACK/NACK information, and other layers do not transmit anything in the position. At this time, power of the resource transmitting the ACK/NACK information may be increased.

RI Transmission Method

A method of transmitting a rank indicator (RI) among control information will be described below.

Example Embodiment #1

Like ACK/NACK information, an RI may be one bit or two bits. Respective cases in which an RI is one bit and two bits will be separately described.

1) When RI is One Bit

An RI is encoded to generate bits corresponding to one QAM symbol, and the generated bits are repeated to generate bits corresponding to several QAM symbols. Then, the generated bits are scrambled. Here, it is assumed that the QAM symbols obtained through modulation mapping are $c_1$, $c_2, \ldots$, and $C_M$, and transmission is performed using J frequency resources in each OFDM symbol section. In this case, according to 3GPP TS 36.211 V.8.6.0 (see FIG. 1), Layer 1 transmits $[c_1, c_2, \ldots, c_J]$ using a second OFDM symbol of a first slot, $[c_{J+1}, c_{J+2}, \ldots, c_{2J}]$ using a sixth OFDM symbol of the first slot, $[c_{2J+1}, c_{2J+2}, \ldots, c_{3J}]$ using a second OFDM symbol of a second slot, and $[c_{3J+1}, c_{3J+2}, \ldots, c_{4J}]$ using a sixth OFDM symbol of the second slot.

In this example embodiment of the present invention, QAM symbols are multiplied by different codes according to respective layers and transmitted. To be specific, assuming that a $k^{th}$ code having a length J is $u_k = [u_{k,1}, u_{k,2}, \ldots, u_{k,J}]^T$, a $k^{th}$ layer transmits $[u_{k,1}c_1, u_{k,2}c_2, \ldots, u_{k,J}c_1]$ using a second OFDM symbol of a first slot, $[u_{k,1}c_{J+1}, u_{k,2}c_{J+2}, \ldots, u_{k,J}c_{2J}]$ using a sixth OFDM symbol of the first slot, $[u_{k,1}c_{2J+1}, u_{k,2}c_{2J+2}, \ldots, u_{k,J}c_{3J}]$ using a second OFDM symbol of a second slot, and $[u_{k,1}c_{3J+1}, u_{k,2}c_{3J+2}, \ldots, u_{k,J}c_{4J}]$ using a sixth OFDM symbol of the second slot.

Here, a code $u_1$ for a first layer can be $[1, 1, \ldots, 1]$. In this case, Layer 1 transmits the same value as specified in 3GPP TS 36.211 V.8.6.0. Example embodiments for a code $u_k$ can be Hadamard code, DFT matrix code, Zadoff-Chu code, and so on.

2) When RI is Two Bits

In this case, a 2-bit RI is encoded to generate bits corresponding to three QAM symbols, and the generated bits are repeated to generate bits corresponding to several QAM symbols. Then, the generated bits are scrambled. Here, it is assumed that the QAM symbols obtained through modulation mapping are $c_1, c_2, \ldots$, and $c_{M2}$, and transmission is performed using J frequency resources for each OFDM symbol section.

In this example embodiment of the present invention, RI QAM symbols are multiplied by different codes according to a plurality of layers and transmitted. To be specific, assuming that a $k^{th}$ code having a length J is $u_k = [u_{k,1}, u_{k,2}, \ldots, u_{k,J}]^T$, a $k^{th}$ layer transmits $[u_{k,1}c_1, u_{k,2}c_2, \ldots, u_{k,J}]$ using a second OFDM symbol of a first slot, $[u_{k,1}c_{J+1}, u_{k,2}c_{J+2}, \ldots, u_{k,J}c_{2J}]$ using a sixth OFDM symbol of the first slot, $[u_{k,1}c_{2J+1}, u_{k,2}c_{2J+2}, \ldots, u_{k,J}c_{3J}]$ using a second OFDM symbol of a second slot, and $[u_{k,1}c_{3J+1}, u_{k,2}c_{3J+2}, \ldots, u_{k,J}c_{4J}]$ using a sixth OFDM symbol of the second slot.

Here, a code $u_1$ for a first layer can be $[1, 1, \ldots, 1]$. In this case, Layer 1 transmits the same value as specified in 3GPP TS 36.211 V.8.6.0. Example embodiments for a code $u_k$ can be Hadamard code, DFT matrix code, Zadoff-Chu code, and so on.

To generate three QAM symbols by encoding the above-mentioned 2-bit RI, the same conventional encoding method as specified in 3GPP TS 36.211 V.8.6.0 may be used, or the following new method according to this example embodiment of the present invention may be used.

To generate three QAM symbols by encoding a 2-bit RI, the method according to this example embodiment of the present invention designs the three QAM symbols to uniformly vary.

Figure 3:
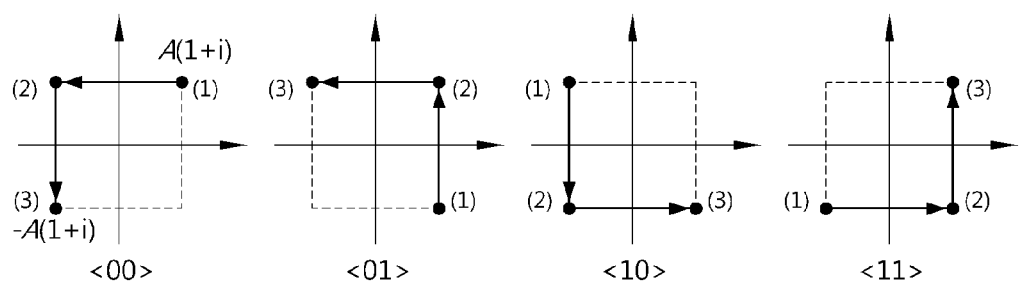
FIG. 3 illustrates a method of encoding a 2-bit rank indicator (RI) according to example embodiments of the present invention and QAM symbols.

FIG. 3 illustrates a method of encoding a 2-bit RI according to example embodiments of the present invention and QAM symbols.

In other words, FIG. 3 illustrates an example of three symbols designed to have a phase varying by 90 degrees according to an example embodiment of the present invention.

For example, when a 2-bit RI is 00, encoding is carried out to generate three QAM symbols $A(1+i)$, $A(-1+i)$, and $-A(1+i)$, thereby obtaining bits. Here, A has a value varying according to QPSK, 16 QAM, and 64 QAM.

Example Embodiment #2

In another method of transmitting an RI using a plurality of layers through a PUSCH, Layer 1 transmits the RI in the same method as specified in 3GPP TS 36.211 V.8.6.0, and the other layers transmit data in resource positions in which Layer 1 transmits the RI.

In still another method of transmitting an RI using a plurality of layers through a PUSCH, Layer 1 transmits the RI in the same method as specified in 3GPP TS 36.211 V.8.6.0, and the other layers do not transmit anything in the resource positions.

In yet another method of transmitting an RI using a plurality of layers through a PUSCH, Layers 1, 2, . . . , and Q (i.e., some layers) transmit the RI in resource positions in which an RI is transmitted as specified in 3GPP TS 36.211 V.8.6.0, and the other layers (layers other than the some layers) transmit data in the resource positions.

In a method for Q, all layers obtained from the same codeword are used. For example, when a codeword is divided by four layers, Q indicates four. In another method for Q, one layer is used.

When an RI is transmitted using a plurality of layers, different scrambling bits may be applied to a signal mapped to the respective layers. In this way, interference between the layers can be reduced.

In yet another method of transmitting an RI using a plurality of layers through a PUSCH, the RI is encoded and scrambled, and the QAM symbols $c_1, c_2, \ldots$, and $c_{M2}$ obtained through modulation mapping are separately transmitted using the layers. To be specific, when J frequency resources are used for each OFDM symbol section, and the number of layers is N, $c_1, c_{N+1}, c_{2N+1}, \ldots$ are transmitted through Layer 1, and $c_2, c_{N+2}, c_{2N+2}, \ldots$ are transmitted through Layer 2. In a method available at this time, only one layer transmits an RI in a resource position for transmitting an RI, and other layers do not transmit anything in the position. At this time, power of the resource transmitting the RI may be increased.

CQI/PMI Transmission Method

Figure 4:
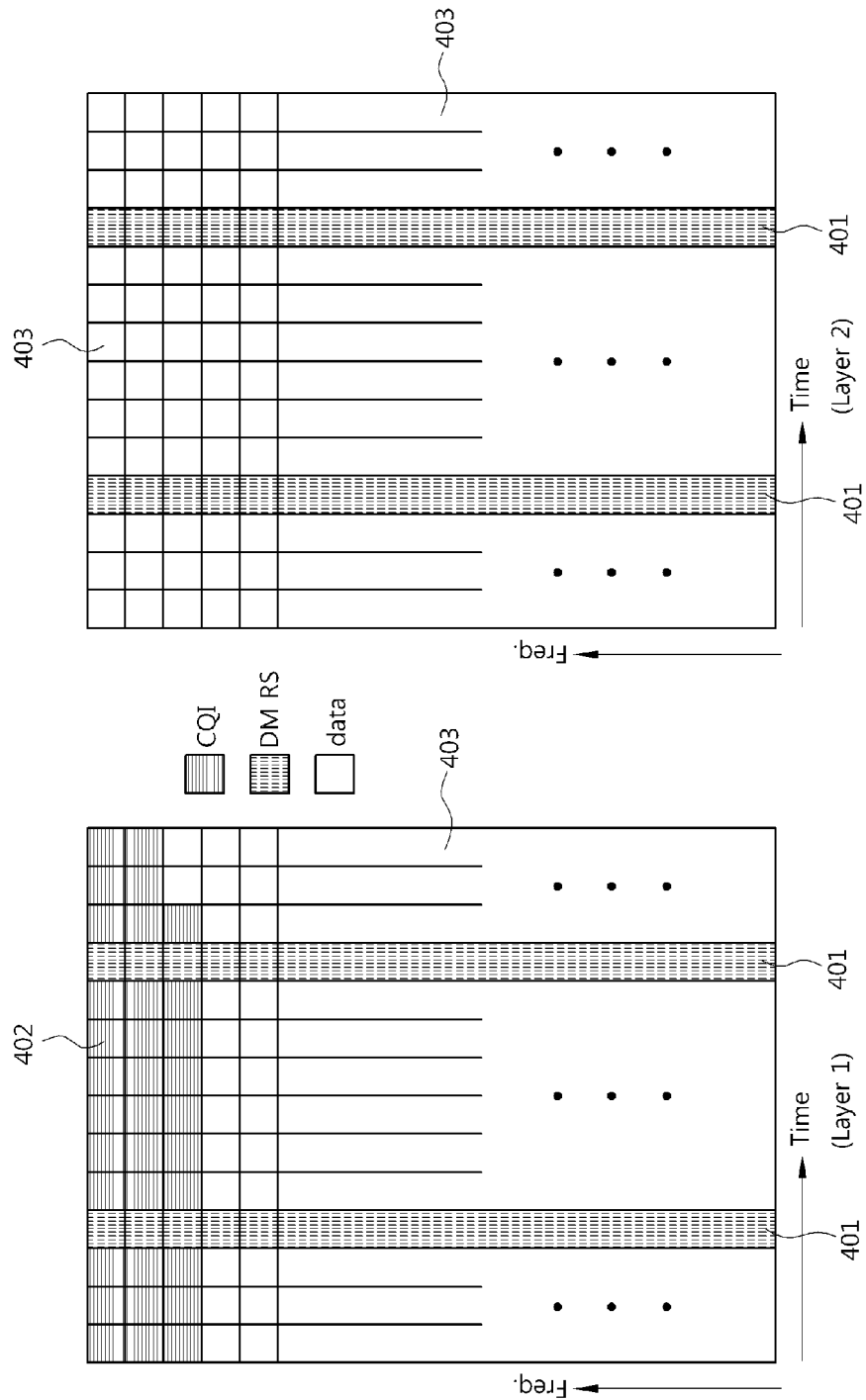
FIG. 4 illustrates a channel quality indicator (CQI)/precoding matrix indicator (PMI) transmission method according to example embodiments of the present invention.

FIG. 4 illustrates a channel quality indicator (CQI)/precoding matrix indicator (PMI) transmission method according to example embodiments of the present invention.

Referring to FIG. 4, a method in which Layer 1 (e.g., the left diagram of FIG. 4) transmits a CQI/PMI using the same resources 402 as specified in 3GPP TS 36.211 V.8.6.0, and other layers (e.g., the right diagram of FIG. 4 denoted by Layer 2) transmit data in resource positions 403 corresponding to the resources 402 of Layer 1 is illustrated as a method of transmitting a CQI/PMI through a PUSCH according to example embodiments of the present invention.

Figure 5:
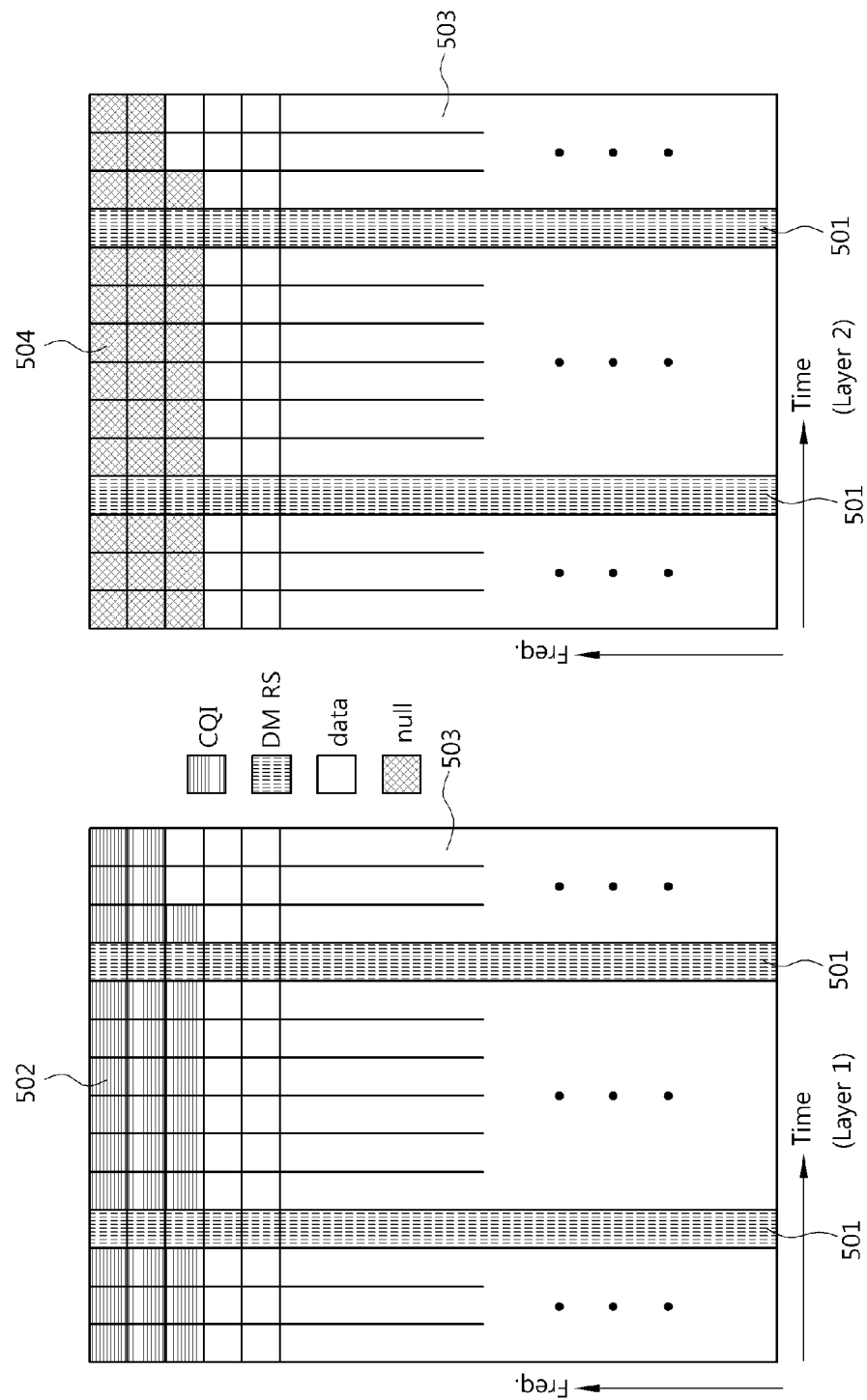
FIG. 5 illustrates a CQI/PMI transmission method according to other example embodiments of the present invention.

FIG. 5 illustrates a CQI/PMI transmission method according to other example embodiments of the present invention.

Referring to FIG. 5, a method in which Layer 1 (e.g., the left diagram of FIG. 5) transmits a CQI/PMI using the same resources 502 as specified in 3GPP TS 36.211 V.8.6.0, and other layers (e.g., the right diagram of FIG. 5 denoted by Layer 2) transmit nothing in resource positions 504 corresponding to the resources 502 of Layer 1 is illustrated as a method of transmitting a CQI/PMI through a PUSCH according to the other example embodiments of the present invention.

In another method of transmitting a CQI/PMI through a PUSCH according to still other example embodiments of the present invention, Layer 1 transmits a CQI/PMI using the same resources as specified in 3GPP TS 36.211 V.8.6.0, and other layers do not transmit anything. In other words, only one layer operates. Thus, in this method of transmitting a CQI/PMI and data through one layer, transmission is performed in the same way as specified in Release 8 of the 3GPP long term evolution (LTE) TS 36 series.

Figure 6:
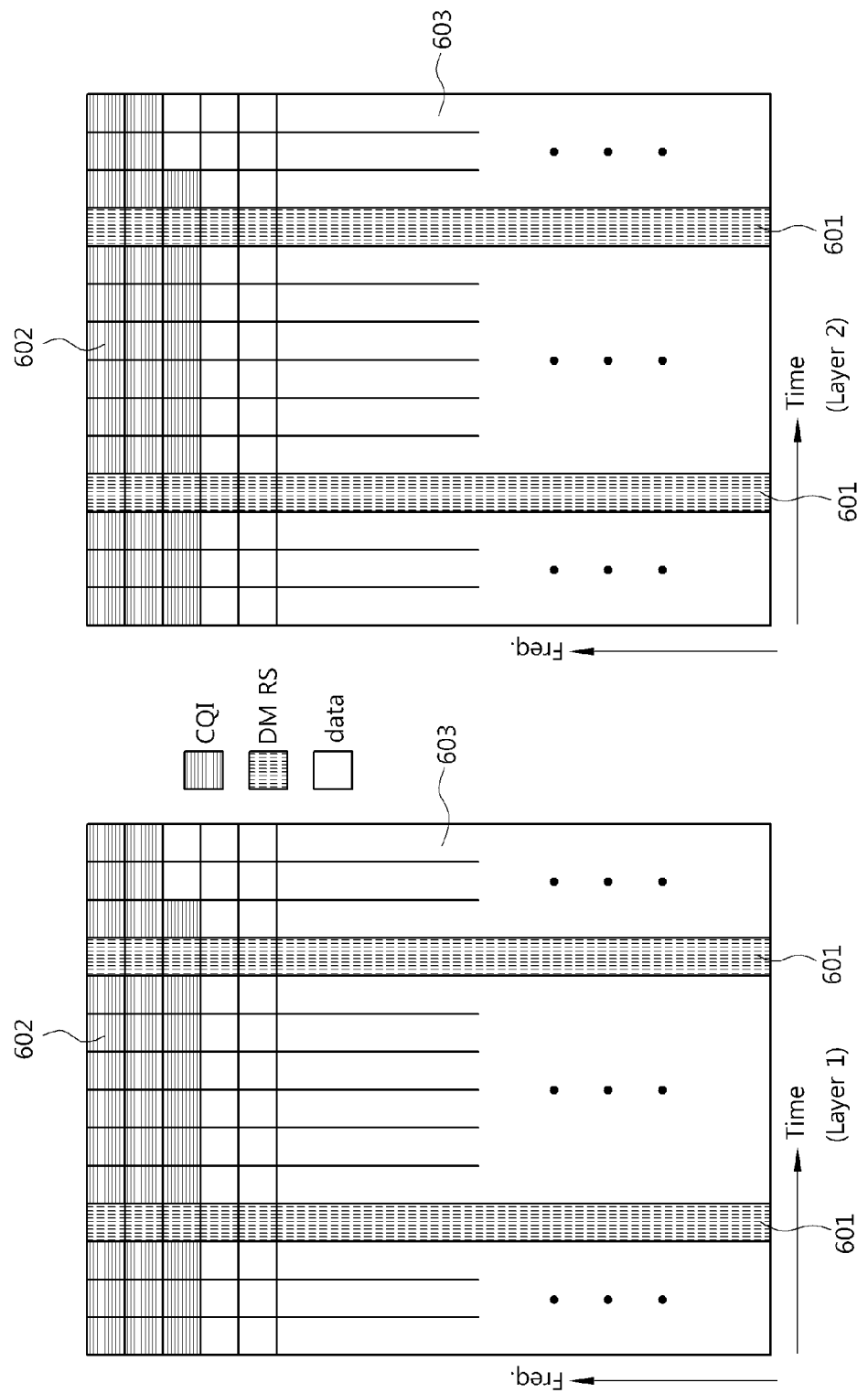
FIG. 6 illustrates a CQI/PMI transmission method according to still other example embodiments of the present invention.

FIG. 6 illustrates a CQI/PMI transmission method according to still other example embodiments of the present invention.

Referring to FIG. 6, a method of transmitting a CQI/PMI encoded by one channel encoder using several layers is illustrated as a method of transmitting a CQI/PMI through a PUSCH according to the still other example embodiments of the present invention.

In a method, the encoded CQI/PMI is transmitted using all layers. In other methods, the encoded CQI/PMI is transmitted using only some layers. In one of the latter methods, all layers obtained from the same codeword are used. For example, FIG. 6 illustrates a case in which Layer 1 (the left diagram of FIG. 6) and Layer 2 (the right diagram of FIG. 6) transmit an encoded CQI/PMI using the same resource 602.

In another of the latter methods, one layer is used.

In a method of dividing the encoded CQI/PMI according to layers, the same value is repeatedly transmitted using all the layers. By multiplying the same value and different scrambling bits according to the layers, products of the value and the scrambling bits are distinguished from each other.

In another method of dividing the encoded CQI/PMI according to layers, the encoded CQI/PMI is divided into M pieces and transmitted using M layers. In other words, only a part of the encoded CQI/PMI is transmitted through each layer. The M pieces of data can be likewise multiplied by different scrambling bits according to the layers.

When a CQI/PMI is transmitted through a plurality of layers, the respective layers use the same number of (time and frequency) resources and the same (time and frequency) resource positions to transmit the CQI/PMI.

When a CQI/PMI is transmitted using a plurality of layers, different scrambling bits may be applied to a signal mapped to the respective layers. In this way, interference between the layers can be reduced.

Layers through which a CQI/PMI is not transmitted may transmit data or nothing in resource positions in which the CQI/PMI is transmitted through other layers.

In another method of transmitting a CQI/PMI through a PUSCH according to example embodiments of the present invention, the CQI/PMI transmitted through M layers is encoded by separate channel encoders, respectively. Here, M may be equal to the number of entire layers, or smaller than the number. When M is smaller than the number of entire layers, the number of layers constituting a codeword transmitting the CQI/PMI can be used.

When a CQI/PMI is transmitted through a plurality of layers, the respective layers use the same number of (time and frequency) resources and the same (time and frequency) resource positions to transmit the CQI/PMI.

When a CQI/PMI is transmitted using a plurality of layers, different scrambling bits may be applied to a signal mapped to the respective layers. In this way, interference between the layers can be reduced.

Separation between Control Information Transmission Region and Data Transmission Region To transmit control information through a PUSCH channel region, a control information transmission region and a data transmission region can be separated according to time or frequency.

Figure 7:
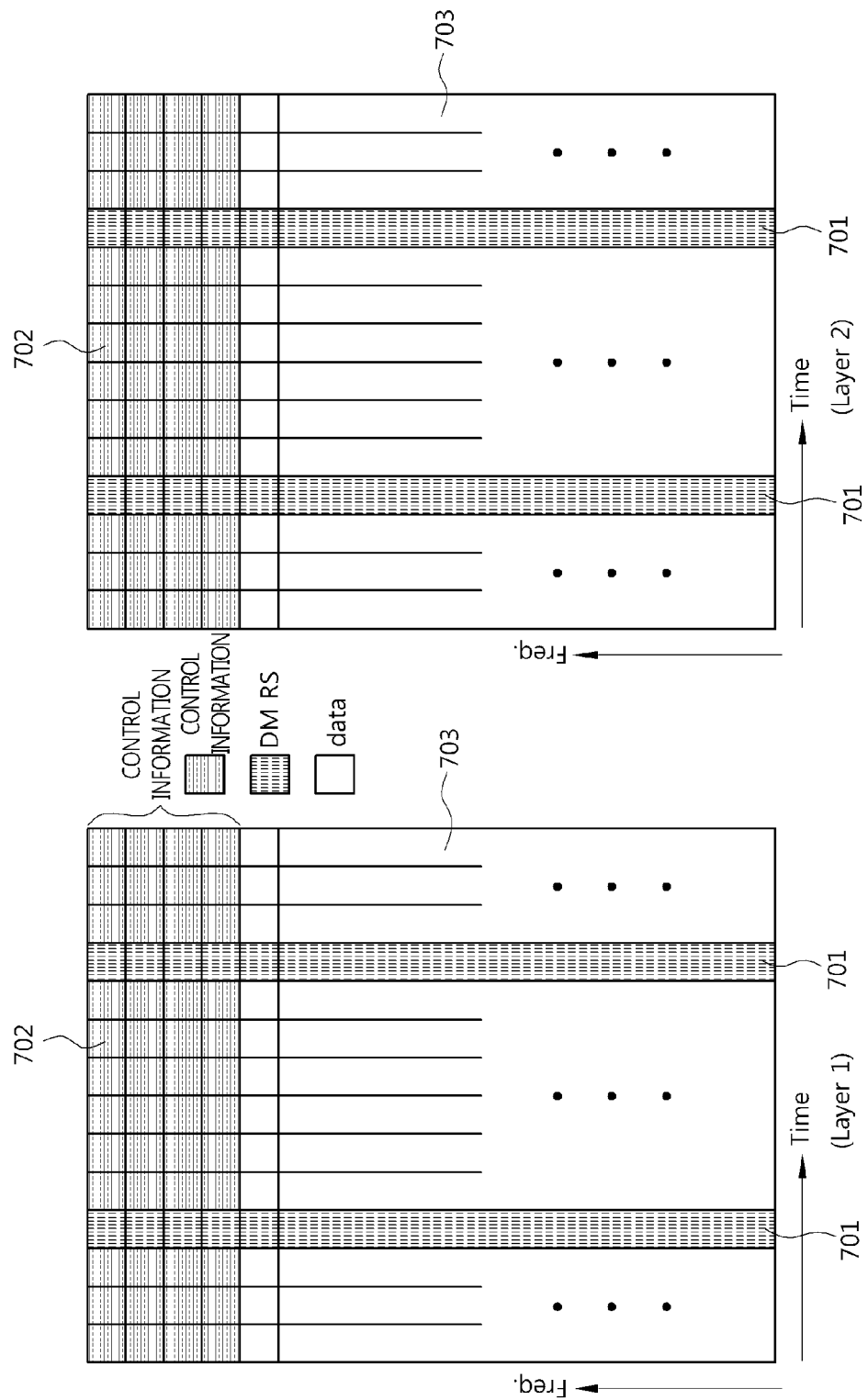
FIG. 7 illustrates a control information transmission method according to example embodiments of the present invention.

FIG. 7 illustrates a method of separating a control information transmission region and a data transmission region according to time.

The left diagram of FIG. 7 illustrates a time-frequency resource grid of Layer 1, and the right diagram of FIG. 7 illustrates a time-frequency resource grid of Layer 2.

In other words, when control information is transmitted through a PUSCH channel region, a control information transmission region 702 and a data transmission region 703 are separated using different frequencies in all layers.

Figure 8:
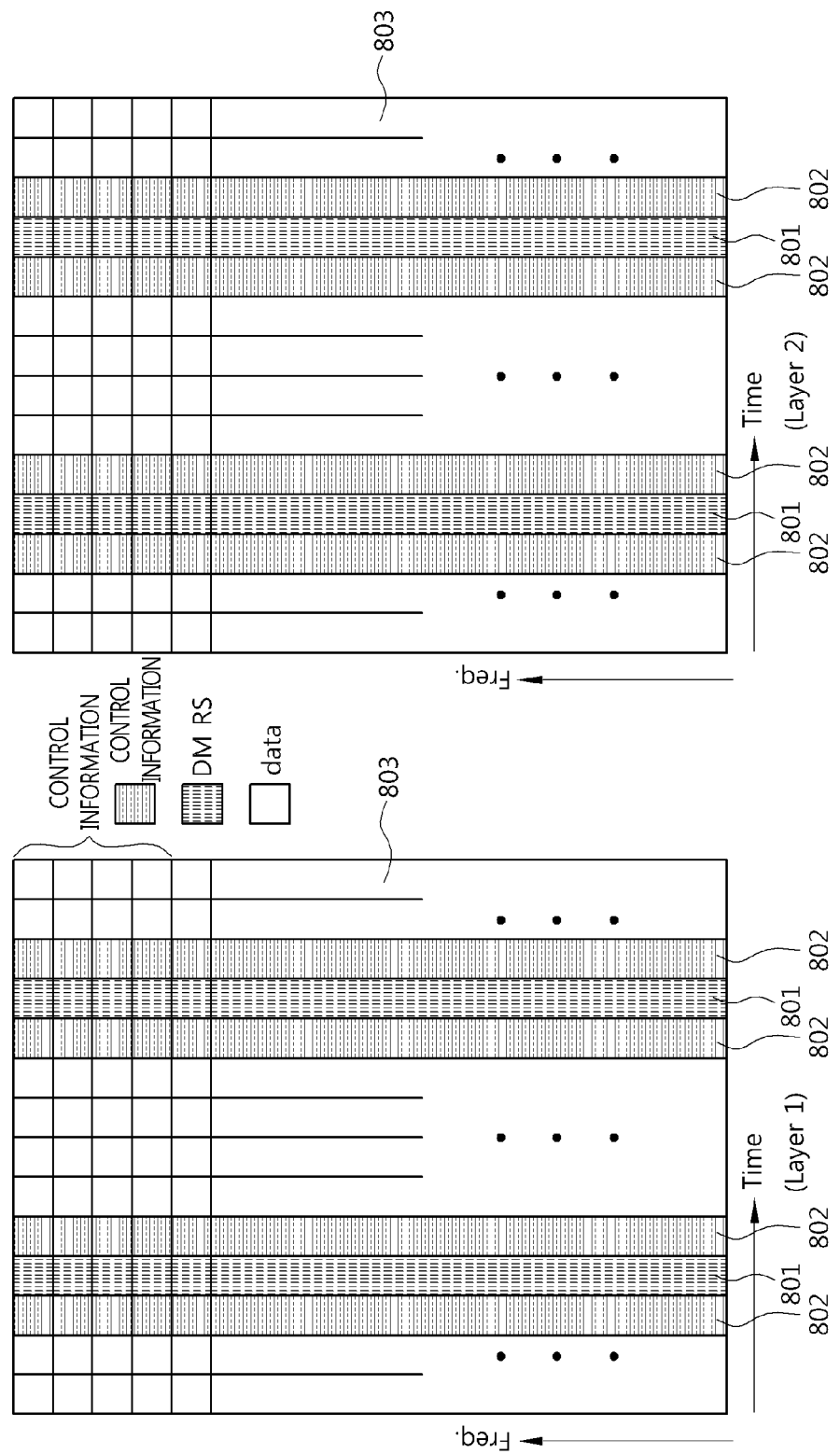
FIG. 8 illustrates a control information transmission method according to other example embodiments of the present invention.

FIG. 8 illustrates a method of separating a control information transmission region and a data transmission region according to frequency.

The left diagram of FIG. 8 illustrates a time-frequency resource grid of Layer 1, and the right diagram of FIG. 8 illustrates a time-frequency resource grid of Layer 2.

In other words, when control information is transmitted through a PUSCH channel region, a control information transmission region 802 and a data transmission region 803 are separated using different transmission time sections in all layers.

Method of Selecting Layer or Codeword for Transmitting Control Information

When control information is transmitted through only one of all layers constituting a PUSCH or through all layers corresponding to a specific codeword, the one specific layer or the specific codeword for transmitting the control information is selected as described below (the control information includes at least one of a CQI, a PMI, ACK/NACK information, and an RI).

In a first method, when there are layers having a high modulation and coding scheme (MCS) level and a low MCS level, control information is transmitted through a layer having the high MCS level. Since the layer having the high MCS level represents a good channel state, it is highly likely that control information will be transmitted without an error. Also, a PUSCH uses fewer resources due to the high MCS level, and thus the number of resources capable of transmitting data increases. Meanwhile, when there are several layers having the same MCS level, control information is transmitted through one of the layers, which is selected according to a rule predetermined between a transmitting side and a receiving side. For example, the rule may be set to transmit control information through a layer having the largest layer number or the smallest layer number.

In a second method, when there are layers having a high MCS level and a low MCS level, a terminal is informed by signaling of an upper level whether to transmit control information through a layer having the high MCS level or a layer having the low MCS level. When a receiving side uses successive interference cancellation (SIC), the layer having the high MCS level uses the high MCS level on the assumption that interfering signals (i.e., signals having a low MCS level) are completely removed. For this reason, only when signals having a low MCS level are completely detected, is it possible to detect signals having a high MCS level. Thus, when the receiving side uses an SIC-based receiver, it is effective to transmit control information through the layer having the low MCS level. In brief, it is effective to transmit control information through the layer having the high MCS level when the receiving side does not use an SIC-based receiver, and it is effective to transmit control information through the layer having the low MCS level when the receiving side uses an SIC-based receiver. As a result, it is useful to inform the terminal by signaling of an upper level whether to transmit control information using the layer having the high MCS level or the layer having the low MCS level. Meanwhile, when there are several layers having the same MCS level, control information is transmitted through one of the layers, which is selected according to a rule predetermined between a transmitting side and a receiving side. For example, the rule may be set to transmit control information through a layer having the largest layer number or the smallest layer number.

In a third method, a base station transmits related information to a terminal through a physical downlink control channel (PDCCH), thereby informing the terminal whether to transmit control information through a layer having a high MCS level or a layer having a low MCS level. When there are several layers having the same MCS level, control information is transmitted through one of the layers, which is selected according to a rule predetermined between a transmitting side and a receiving side. For example, the rule may be set to transmit control information through a layer having the largest layer number or a layer having the smallest layer number.

In another method of transmitting control information through a PUSCH, when there are layers having a high MCS level and a low MCS level, one of the high MCS level or the low MCS level is selected as described above, and the control information is transmitted to all layers having the selected MCS level.

When control information is transmitted through all layers corresponding to a specific codeword among all layers constituting a PUSCH, the specific one codeword for transmitting the information is selected as described below.

In a first method, when there are codewords having a high MCS level and a low MCS level, control information is transmitted through layers corresponding to a codeword having the high MCS level. When there are two codewords having the same MCS level, control information is transmitted through all layers corresponding to one of the two codewords, which is selected according to a rule predetermined between a transmitting side and a receiving side. For example, the rule may be set to transmit control information using a codeword having the largest codeword number or the smallest codeword number.

In a second method, when there are codewords having a high MCS level and a low MCS level, a terminal is informed by signaling of an upper level whether to transmit control information through layers corresponding to a codeword having the high MCS level or layers corresponding to a codeword having the low MCS level.

In a third method, a base station transmits related information to a terminal through a PDCCH, thereby informing the terminal whether to transmit control information using a codeword having a high MCS level or a codeword having a low MCS level. When there are several codewords having the same MCS level, control information is transmitted through one of the codewords, which is selected according to a rule predetermined between a transmitting side and a receiving side. For example, the rule may be set to transmit control information using a codeword having the largest codeword number or a codeword having the smallest codeword number.

When the above-described method of transmitting control information through a PUSCH region according to example embodiments of the present invention is used and MIMO antenna transmission in which transmission is performed through a plurality of layers using a plurality of antennas is applied to an uplink, it is possible to transmit control information (ACK/NACK information, a PMI/CQI, and an RI) through a plurality of layers using the PUSCH region.

While the example embodiments of the present invention and their advantages have been described in detail, it should be understood that various changes, substitutions and alterations may be made herein without departing from the scope of the invention.

What is claimed is:

1. A method of transmitting control information to a base station, the method comprising:
   transmitting control information through a first resource region of a first layer in a frequency-time domain; and
   transmitting data using through a second resource region of a second layer in the frequency-time domain,
   wherein the second layer is different from the first layer,
   wherein the control information is transmitted through an uplink shared channel,
   and at least a part of the second resource region overlaps with the first resource region in the frequency-time domain.

2. The method of claim 1, wherein the control information is COI/PMI (Channel Quality Indicator and Precoding Matrix Indicator) information.

3. The method of claim 1, further comprising transmitting control information or data through a third resource region of a third layer,
   wherein at least a part of the third resource region overlaps with the first resource region in the frequency-time domain.

4. The method of claim 1, further comprising transmitting control information through a third resource region of a third layer and transmitting data using a fourth resource region of a fourth layer,
   wherein at least a part of the third resource region overlaps with the first resource region in the frequency-time domain, and at least a part of the fourth resource region overlaps with the first resource region in the frequency-time domain.

5. The method of claim 1, further comprising transmitting control information through a third resource region of a third layer, wherein a first part of the control information is transmitted through the first resource region of the first layer and a second part of the control information is transmitted through the third resource region of the third layer,
   and wherein at least a part of the third resource region overlaps with the first resource region in the frequency-time domain.

6. The method of claim 1, wherein a first codeword mapped to the first layer has a higher MCS (Modulation and Coding Scheme) level than a second codeword mapped to the second layer.

7. The method of claim 1, wherein a first codeword mapped to the first layer has a lower codeword number than a second codeword mapped to the second layer when the first codeword and the second codeword have the same MCS level.

8. The method of claim 1, wherein the second resource region corresponds to the first resource region in the frequency-time domain.

9. The method of claim 8, wherein only the control information but no data is transmitted through the first resource region, and only the data but no control information is transmitted through the second resource region.

10. A method of transmitting control information to a base station, the method comprising:
  encoding the control information;
  separating the encoded control information into N parts; and
  transmitting the N parts of control information using N layers,
  wherein the N is a positive integer number greater than 1, and the control information is transmitted through an uplink shared channel.

11. The method of claim 10, wherein the control information is channel quality indicator (Cal), precoding matrix indicator (PMI), ACK/NACK or rank indicator (RI).

12. The method of claim 10, wherein the N layers are all layers mapped to a same codeword when the control information is CQI/PMI.

13. The method of claim 10, wherein the N is total number of layers when the control information is ACK/NACK or RI.

14. A method of receiving control information from a terminal, the method comprising:
  receiving a first codeword through a first layer; and
  receiving a second codeword through a second layer,
  wherein data is received through a first resource region of the first layer in a frequency-time domain and control information is received through a second resource region of the second layer in the frequency-time domain when the second codeword has a higher MCS (Modulation and Coding Scheme) level than the first codeword,
  wherein at least part of the second resource region overlaps with the first resource region in the frequency-time domain,
  wherein the second layer is a layer different from the first layer.

15. The method of claim 14, wherein the data received through the first resource region is part of the first codeword.

16. The method of claim 14, wherein the second resource region corresponds to the first resource region in the frequency-time domain.

17. The method of claim 16, wherein only the control information but no data is transmitted through the first resource region, and only the data but no control information is transmitted through the second resource region.

18. A terminal for transmitting control information to a base station, the terminal comprising a processor configured to:
  transmit control information through a first resource region of a first layer in a frequency-time domain; and
  transmitting data through a second resource region of a second layer in the frequency-time domain,
  wherein the second layer is different from the first layer,
  wherein the control information is transmitted through an uplink shared channel,
  and at least a part of the second resource region overlaps with the first resource region in the frequency-time domain.

19. The terminal of claim 18, wherein the control information is CQI/PMI (Channel Quality Indicator and Precoding Matrix Indicator) information.

20. The terminal of claim 18, the processor further configured to transmit control information or data through a third resource region of a third layer,
  wherein at least a part of the third resource region overlaps with the first resource region in the frequency-time domain.

21. The terminal of claim 18, the processor further configured to transmit control information through a third resource region of a third layer and transmitting data using a fourth resource region of a fourth layer,
  wherein at least a part of the third resource region overlaps with the first resource region in the frequency-time domain, and at least a part of the fourth resource region overlaps with the first resource region in the frequency-time domain.

22. The terminal of claim 18, the processor further configured to transmit Control information through a third resource of a third layer, wherein a first part of the Control information is transmitted through the first resource region of the first layer and a second Part of the control information is transmitted through the third resource region of the third layer,
  and where in at least a part of the third resource region overlaps with the first resource Region in the frequency-time domain.

23. A base station for receiving control information from a terminal, the base station comprising a processor configured to:
  receive a first codeword through a first layer; and
  receive a second codeword through a second layer,
  wherein data is received through a first resource region of the first layer in a frequency-time domain and control information is received through a second resource region of the second layer in the frequency-time domain when the second codeword has a higher MCS (Modulation and Coding Scheme) level than the first codeword,
  wherein at least part of the second resource region overlaps with the first resource region in the frequency-time domain,
  wherein the second layer is a layer different from the first layer.

24. The base station of claim 23, wherein the data received through the first resource region is part of the first codeword.

* * * * *

UNITED STATES PATENT AND TRADEMARK OFFICE
CERTIFICATE OF CORRECTION

PATENT NO. : 9,462,573 B2
APPLICATION NO. : 13/718629
DATED : October 4, 2016
INVENTOR(S) : Bang Won Seo, Young Jo Ko and Byung Jang Jeong Page 1 of 1

It is certified that error appears in the above-identified patent and that said Letters Patent is hereby corrected as shown below:

In the Claims

Claim 1, Column 12, Line 27, delete "using".

Claim 18, Column 14, Line 1, change "transmitting" to "transmit".

Claim 21, Column 14, Line 20, change "transmitting" to "transmit".

Claim 22, Column 14, Line 28, change "Control" to "control".

Claim 22, Column 14, Line 29, change "Control" to "control".

Claim 22, Column 14, Line 31, change "Part" to "part".

Claim 22, Column 14, Line 35, change "Region" to "region".

Signed and Sealed this
Twenty-fifth Day of December, 2018

Andrei Iancu
*Director of the United States Patent and Trademark Office*